United States Patent
Guo et al.

(10) Patent No.: US 7,380,003 B1
(45) Date of Patent: May 27, 2008

(54) METHOD AND SYSTEM FOR STAGED WEB SERVICE UPGRADE FROM AN EXISTING VERSION TO A DIFFERENT VERSION

(75) Inventors: Wei-Quiang Michael Guo, Bellevue, WA (US); Ying-Kin Tony Yip, Kirkland, WA (US); Neelamadhaba Mahapatro, Redmond, WA (US); Rui Chen, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1161 days.

(21) Appl. No.: 10/697,517

(22) Filed: Oct. 30, 2003

(51) Int. Cl.
*G06F 15/16* (2006.01)
*G06F 15/173* (2006.01)

(52) U.S. Cl. .................. 709/226; 709/203; 709/224; 709/225; 709/239

(58) Field of Classification Search ............ 709/203, 709/218, 223, 225, 226, 318, 247; 707/100; 345/747
See application file for complete search history.

(56) References Cited

U.S. PATENT DOCUMENTS

| | | | | |
|---|---|---|---|---|
| 6,125,363 | A * | 9/2000 | Buzzeo et al. ............ | 707/100 |
| 6,425,125 | B1 | 7/2002 | Fries et al. | |
| 2002/0010798 | A1 * | 1/2002 | Ben-Shaul et al. ........ | 709/247 |
| 2002/0054090 | A1 * | 5/2002 | Silva et al. ............... | 345/747 |
| 2002/0178214 | A1 * | 11/2002 | Brittenham et al. ....... | 709/203 |
| 2002/0194501 | A1 | 12/2002 | Wenocur et al. | |
| 2003/0061404 | A1 * | 3/2003 | Atwal et al. .............. | 709/328 |
| 2004/0068553 | A1 * | 4/2004 | Davis et al. .............. | 709/218 |
| 2004/0103195 | A1 * | 5/2004 | Chalasani et al. ......... | 709/226 |
| 2005/0015491 | A1 * | 1/2005 | Koeppel .................. | 709/225 |
| 2005/0044197 | A1 * | 2/2005 | Lai ........................ | 709/223 |

OTHER PUBLICATIONS

Kormann et al., "Risks of the Passport Single Signon Protocol," IEEE Computer Networks, Jul. 2000, 12 pages.
"Microsoft.Net: A Developer's Overview," www.elementk.com, 11 pages, Rochester, New York, U.S.A.
White Paper for "Windows 2000 Clustering: Performing a Rolling Upgrade," 22 pages.

* cited by examiner

*Primary Examiner*—Quang N. Nguyen
(74) *Attorney, Agent, or Firm*—Senniger Powers (57) ABSTRACT

Managing a web service provided by a plurality of servers coupled to a data communication network. Two versions of the web service are executed on the plurality of servers and a selected version of the web service is identified for execution based on a request from a user for access the web service. While access to the web service is permitted via at least one server, the web service is updated on at least one other server. One or more servers providing the web service may specify a default version of the web service as the selected version if the request from the user does not specify a version of the web service for access.

36 Claims, 5 Drawing Sheets

METHOD AND SYSTEM FOR STAGED WEB SERVICE UPGRADE FROM AN EXISTING VERSION TO A DIFFERENT VERSION

TECHNICAL FIELD

Embodiments of the present invention relate to the field of upgrading a web service from an existing version to a different version. In particular, embodiments of the present invention relate to processing user requests for the web service during a period in which the web service is being upgraded.

BACKGROUND OF THE INVENTION

In today's web service environments, a large number of web servers often provide web services (e.g., multi-site authentication services, web-based e-mail services, content providers, metadata providers, etc.). As more and more users request web services via the Internet, and as the web services become increasingly complex, a few number of web servers would not be able to handle all of the web service requests. Thus, it is very common for a particular web service to be provided by hundreds of web servers. Adding to the fact that maintaining these hundreds of web servers by itself is a difficult job for system administrators, upgrading the web service from an existing version to a different or newer version for all of the web servers often requires tremendous effort and time. In addition, providing users access to the web service during a period in which the web service is being upgraded presents another level of difficulty for system administrators. Web services rarely go through beta testing, and version rollback frequently occurs after a different or newer version of the web service has been rolled out. In other words, users often experience a large discontinuity of the web service, which often results in large user support volume that may overwhelm support personnel.

In the prior art, upgrading a web service provided by a group of web servers commonly requires taking a number of the web servers out of service (e.g., half of the web servers), removing the older version of the web service from the web servers taken out of service, installing the newer version of the web service to the web servers taken out of service, and then putting these web servers back into service. After these web servers are put back into service, the other web servers (e.g., the other half) that still run the older version of the web service are taken out of service. The older version of the web service is then removed from these other web servers; the newer version is installed; and then these other web servers are put back into service as well. Thus, at any given point of time during the web service upgrade process, a number of web servers are out of service and not providing the web service to users. For example, if about half of the web servers are initially taken out of service to install the newer version of the web service, then there is an approximately 50% reduction in the full capacity of the web servers during the upgrade process. This reduction in full capacity can be very expensive to a web service company. Furthermore, users of the web service might experience significant server downtime. Customer support volume might increase significantly. This further contributes to less customer satisfaction with the web service.

Another disadvantage of the prior art systems and methods for upgrading a web service is that users of the web service often do not receive a consistent version of the web service. In other words, the prior art usually does not specify which version of the web service is to be provided to a particular user during the upgrade process. For example, suppose after half of the web servers have been upgraded to the newer version of the web service, a user accesses to one of these upgraded web servers. Thus, this particular user has experienced the newer version of the web service. Subsequently, before the other half of the web servers are taken out of service for upgrade, the user accesses one of these not-yet-upgraded web servers. In this scenario, the user is provided access to the older version of the web service because the particular web server that the user subsequently accesses has not yet been upgraded. This is so even though this particular user has previously "experienced" the newer version of the web service at an upgraded web server. Therefore, the conventional web service upgrades often cannot provide users a consistent web service experience throughout the period of the upgrade process.

Yet another disadvantage of presently available web service upgrades is that system administrators cannot conduct effective beta testing of the newer version of the web service on the web servers. Traditionally, beta testing is very rare in the web service world. This is because a newer version of the web service generally cannot be tested out with real users before it is deployed to the web servers. As described previously, the prior art involves taking a number of web servers out of service, removing the older version of the web service from these web servers, and then installing the newer version of the web service on these web servers. In other words, at any given point of time during the upgrade process, only one version of the web service is installed on a particular web server (i.e., either the older version or the newer version). As such, all users are forced to use the newer version of the web service prior to beta testing of the newer version with a small percentage of the users. Any error or bug in the newer version of the web service may result in an outage of the web service for all of the users rather than for a small percentage of the users. Thus, any presence of error of bug in the newer version may force a full rollback of the web service. The users may experience significant problems accessing the web service during such a full-rollback period. A full rollback may also require system administrators to uninstall the newer version of the web service from the web servers and reinstall the older version of the web service to the web servers. Such un-installation and reinstallation may be a very expensive operational process.

Authenticating the user to allow access to the web service also presents another level of difficulty, since the web service usually does not recognize the user as a prior user who had previously accessed the web service. The prior art systems and methods attempt to address this difficulty by utilizing a large set of web servers partitioned among user base to provide the web service. In this scenario, upgrading the web service to a different or newer version may involve upgrading a partition of the large set of web servers at a time, thus allowing the web servers to "recognize" each user. However, in addition to the many disadvantages discussed above, this prior art approach also reduces the possibility of capacity sharing among all users. Requiring the web servers to recognize each user as a prior user does not fully address the difficulties of a large-scale web service upgrade.

Accordingly, a solution that seamlessly upgrades a web service from an existing version to a different or newer version is desired to address one or more of these and other disadvantages.

SUMMARY OF THE INVENTION

Embodiments of the invention overcome one or more deficiencies in the known art by providing, among other things, a "rolling" upgrade of a web service. In one embodiment, the invention effectively permits incrementally upgrading the web service from an existing version to a different or newer version among one or more web servers. In this staged upgrade embodiment, the invention advantageously allows execution of at least two versions (e.g., an older version and a newer version) of the web service on a particular web server. The invention further advantageously permits providing a user access to a version of the web service based on a selected version of the web service associated with the web server. According to one or more embodiments of the invention, the selected version of the web service generally may be the default version of the web service running on the web server. In accordance with other one or more embodiments of the invention, the selected version of the web service may also be the version registered by the user or the latest version accessed by the user. At least one embodiment of the invention also advantageously allows receiving authentication data to authenticate the user and filtering default and version data to identify the selected version of the web service. Moreover, the features of the present invention described herein are less laborious and easier to implement than currently available techniques as well as being economically feasible and commercially practical.

Briefly described, a method embodying aspects of the invention manages a web service provided by a plurality of servers coupled to a data communication network. At least one of the servers executes a first version of the web service. The method includes executing a second version of the web service on a first server coupled to the data communication network. The method also includes identifying a selected version of the web service based on a request from the user to access the web service via the data communication network. The method further includes providing the user access to the identified selected version of the web service via a client also coupled to the data communication network.

In another embodiment of the invention, a system employing aspects of the invention is adapted to manage a web service provided by a plurality of servers coupled to a data communication network. At least one of the servers executes a first version of the web service. The system includes a first server coupled to the data communication network. The first server is adapted to have a second version of the web service executed thereon. The system also includes computer-executable instructions to identify a selected one of the versions of the web service based on a request from the user to access the web service via the data communication network. The system further includes computer-executable instructions to provide the user access to the identified selected version of the web service via a client also coupled to the data communication network.

In yet another embodiment of the invention, computer-readable media employing aspects of the invention have computer-executable instructions for performing a method to manage a web service provided by a plurality of servers coupled to a data communication network. At least one of the servers executes a first version of the web service. The method includes executing a second version of the web service on a first server coupled to the data communication network. The method also includes processing a request from a user to access the web service via the data communication network to identify a selected version of the web service. The method further includes providing the user access to the identified selected version of the web service via a client also coupled to the data communication network.

In further yet another embodiment of the invention, computer-readable media employing aspects of the invention have computer-executable components for managing a web service provided by a plurality of servers coupled to a data communication network. The computer-readable media include an update component for executing a second version of the web service on a first server coupled to the data communication network. The computer-readable media also include a processing component for processing a request from a user to access the web service via the data communication network to identify a selected version of the web service. The computer-readable media also include a providing component for providing the user access to the identified selected version of the web service via a client also coupled to the data communication network.

One or more computer-readable media having computer-executable instructions for performing web service upgrades embody further aspects of the invention.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
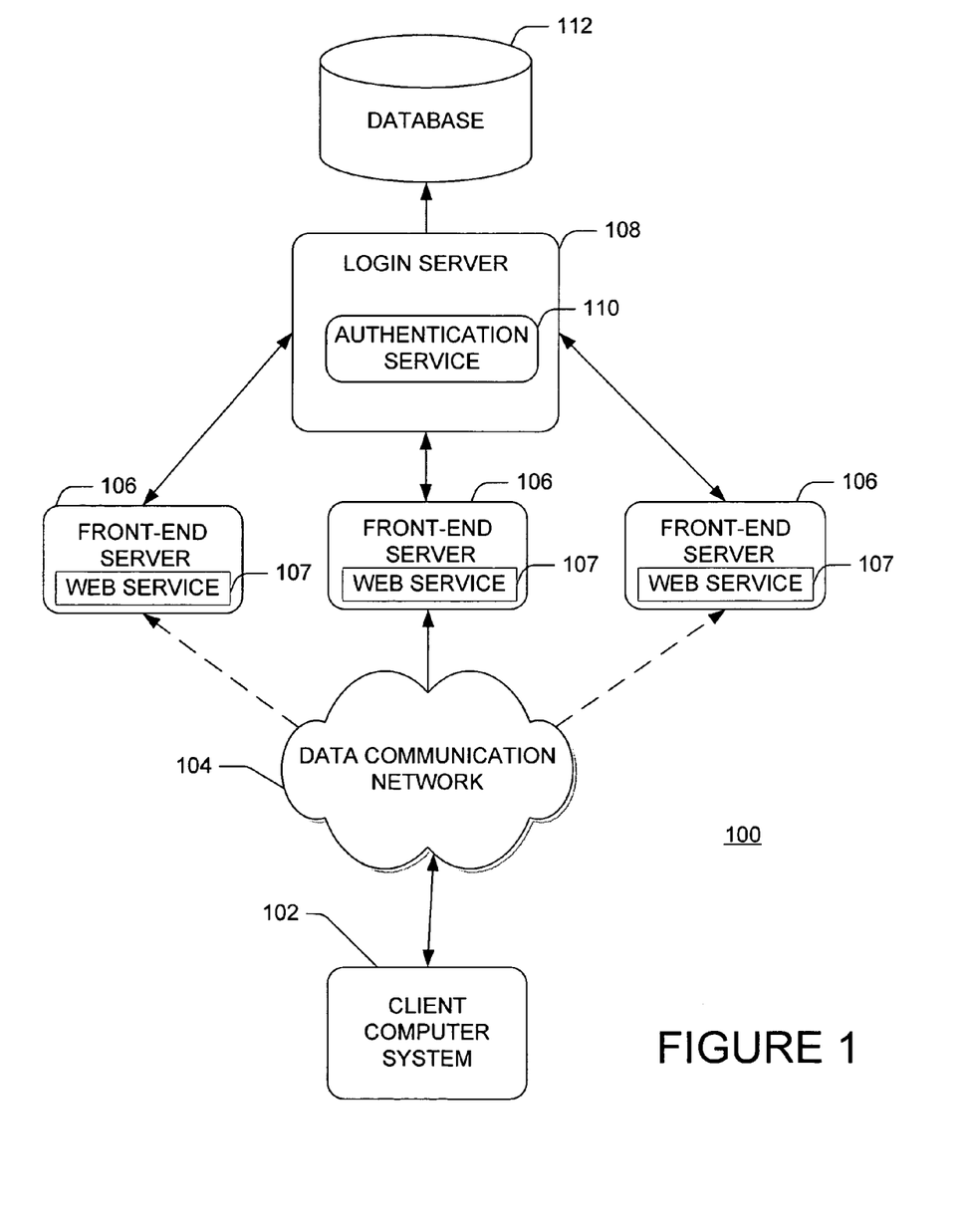
FIG. 1 is a block diagram illustrating an exemplary network environment in which the present invention may be utilized.

FIG. 1 generally shows an exemplary network environment 100 in which the invention may be utilized. A client computer system 102 is coupled to a data communication network 104. In this exemplary embodiment of the invention, data communication network 104 is the Internet (or the World Wide Web). However, the teachings of the invention can be applied to any data communication network. Multiple "front-end" servers 106 are also coupled to data communication network 104 to allow communication between front-end servers 106 and client computer system 102. Front-end servers 106 may also be referred to as "web servers" or "network servers" generally. In operation, client computer system 102 may access a web service 107 provided by one or more of the front-end servers 106 via data communication network 104. However, prior to allowing client computer system 102 to access web service 107, front-end servers 106 may redirect client computer system 102 to a login server 108, which provides an authentication service 110 for authentication of users.

Login server 108 is coupled to data communication network 104 to allow communication between itself, client computer system 102, and front-end servers 106. Although referred to as a "login server" in connection with FIG. 1, login server 108 is also a web server capable of interacting with web browsers and other web servers. In this example, client computer system 102, front-end servers 106, and login server 108 may communicate data among themselves using the hypertext transfer protocol (HTTP), a protocol commonly used on the Internet to exchange information.

FIG. 1 further illustrates a database 112 coupled to login server 108. In one embodiment, database 112 contains information necessary to authenticate a user of client computer system 102 (as well as other users on the data communication network) registered to access web service 107 provided by front-end servers 106. Although database 112 is shown in FIG. 1 as a single storage unit separate from login server 108 for convenience, it is to be understood that in other embodiments of the invention, database 112 may be one or more memories contained within or separate from login server 108. In a federated environment, for example, a plurality of login servers 108 may be used to provide authentication, version filtering, shared services management, policy and permissions management, and the like.

Login server 108, as described herein, includes authentication service 110 that authenticates the user of client computer system 102 seeking access to web service 107 of a particular one of the front-end servers 106. In this embodiment, login server 108 first receives authentication data from the user, such as the user's login identification (ID) and password. If the user is successfully authenticated, login server 108 of FIG. 1 routes client computer system 102 to the appropriate front-end server 106 for performing web service 107 for the user.

Generally, prior to executing authentication service 110 to authenticate the user, the user of client computer system 102 "registers" with login server 108. This registration is a one-time process that provides necessary information to authentication service 110. The user of client computer system 102 registers with login server 108 by providing information about the user and/or client computer system 102, such as the user's name or alternative email address. As part of the user registration process, the user is assigned (or selects) a login ID used to access web service 107. The login ID may also be referred to as a "username," "member name," or "login name." Additionally, the user might select a password associated with the login ID that is used for authentication purpose. The information provided by the user during this registration process (e.g., the login ID and password) is stored in database 112 as valid user data. According to one embodiment of the invention, the registration process also includes registering a version of web service 107 to be provided to the user. In accordance with one embodiment, this registered version might be a selected version of web service 107 associated with a particular front-end server 106 during a rolling or staged upgrade process. The information identifying the version of web service 107 registered by the user is stored in database 112 as version data.

In general, after the user is registered with login server 108, in subsequent requests for web service 107, authentication service 110 of login server 108 validates the authentication data (e.g., login ID and/or password) submitted by the user. Authentication service 110 handles the authentication response by comparing the authentication data submitted by the user to the valid user data stored in database 112. If the authentication data matches the valid user data stored in database 112, the user is authenticated and can visit a particular front-end server 106 to access a particular version of web service 107. The present invention sets forth upgrading web service 107 provided by front-end servers 106 from an existing version (hereinafter version N) to a different or newer version (hereinafter version M) while providing the user access to a particular version of web service 107. The present invention also sets forth upgrading authentication service 110 and offering the user access to one particular version of authentication service 110.

Although described in the context of authentication service 110, it is to be understood that aspects of the invention may be applied to any number of network environments.

Figure 2:
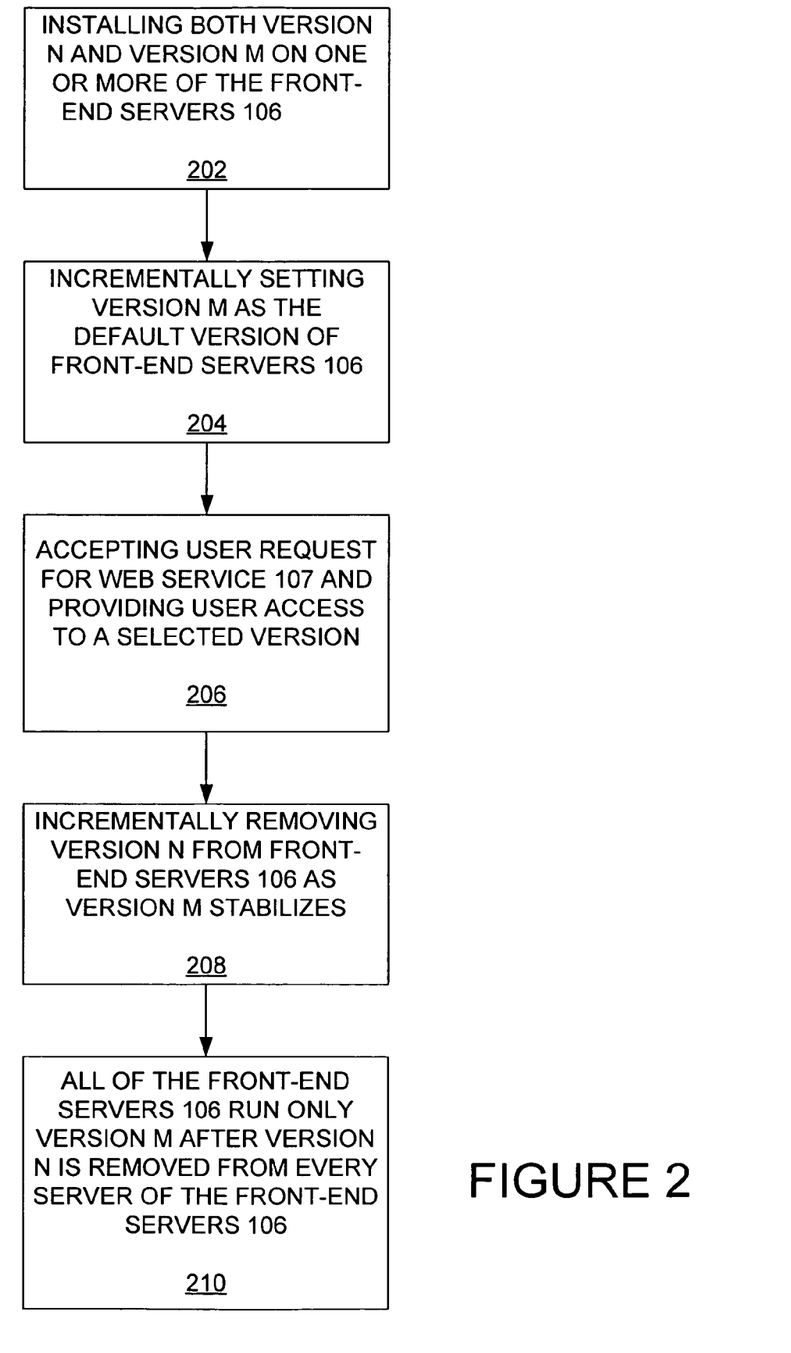
FIG. 2 is an exemplary flow diagram illustrating process flow of a rolling upgrade process according to one embodiment of the invention.

FIG. 2 shows generally a flow diagram illustrating process flow of a staged or rolling upgrade process according to one exemplary embodiment of the present invention. In general, before web service 107 of front-end servers 106 is being upgraded to version M, front-end servers 106 are installed and executed with version N of web service 107. At 202, one or more of the front-end server 106 are installed with version M of web service 107. At this point, front-end servers 106 are installed with two versions of web service 107, namely version N and version M. According to this embodiment of the invention, version N of web service 107 is installed and executed on a particular front-end server 106 before version M is installed and executed on the same front-end server 106. However, it is also contemplated that version N is installed and executed on the particular front-end server 106 contemporaneously with or after the installation and execution of version M on the same front-end server 106.

Installing and executing both version N and version M of web service 107 on front-end servers 106 allows system administrators of front-end servers 106 to perform a rolling upgrade of web service 107 such that version M may be deployed to front-end servers 106 effectively without reducing available server capacity or adversely affecting user experience. This is accomplished because system administrators of front-end servers 106 may incrementally increase the number of front-end servers 106 running version M of web service 107 until every one of the front-end servers 106 runs version M of web service 107. In other words, a small subset of the available front-end servers 106 is taken offline at a time. Incrementally upgrading is shown at 204 of FIG. 2, in which the exemplary embodiment of the invention incrementally configures or sets front-end servers 106 to run version M of web service 107 by default, one or more servers at a time. Thus, while both versions of web service 107 are installed and available on one or more of the front-end servers 106, system administrators may configure one or more of the front-end servers 106 to run version N of web service 107 by default, and configure other one or more of the front-end servers 106 to run version M of web service 107 by default. Such incremental configuration of the default version may allow front-end servers 106 to be operated at near 100% capacity throughout the upgrade process, as distinguished from the prior art. In other words, users of web service 107 might not experience significant server downtime during the entire upgrade process because one or more of the front-end servers 106 are equipped with either version N or version M of web service 107 during the process to provide the users access to web service 107.

One embodiment of the invention operating generally in accordance with FIG. 2 permits beta testing of version M of web service 107. If so desired, system administrators of front-end servers 106 have the capability to rollback one or more of the front-end servers 106 from version M to version N. This rollback capability might be critical because version M of web service 107 might run into unexpected issues that were not or could not have discovered or fixed during the development and testing stages of version M. The added benefit of this embodiment of the invention is that system administrators may realistically beta test version M with a limited number of real users of web service 107. By keeping version N of web service 107 in one or more front-end servers 106, system administrators know that if version M runs into issues on front-end servers 106, version N is available on front-end servers 106 for users to access to web service 107. Therefore, users might experience less trouble while web service 107 is being upgraded. This reduces customer support volume and improves customer satisfaction. Accordingly, the invention's capability to rollback makes it easier for system administrators and operation staff as web service 107 is being upgraded to version M.

Turning back to FIG. 2, at 206, front-end servers 106 accept a user request for web service 107. Which version of web service 107 is provided to the user depends on a selected version of web service 107 associated with the accessed front-end server 106. In one exemplary embodiment, the accessed front-end server 106 redirects the request to login server 108 so that login server 108 may execute a version filtering routine (e.g., a .dll file) to identify the selected version of web service 107 associated with the accessed front-end server 106. In general, the version filtering routine of login server 108 then redirects the request back to the accessed front-end server 106 such that the accessed front-end server 106 may provide the user access to the identified selected version of web service 107 executed on the accessed front-end server 106. An exemplary operation of the version filtering routine in accordance with one embodiment of the invention is discussed hereinafter.

It is also noted that at 206, the user is provided access to at least version N of web service 107. This is because both versions of web service 107 are installed and on one or more of the front-end server 106. A particular front-end server 106 may be configured to have a default version (either version N or version M). Typically, this default version is the selected version of web service 107 that is to be provided to the user. For example, if a particular front-end server 106 is running version N of web service 107 by default, then a user who requests web service 107 from this front-end server 106 is provided access to version N. Similarly, if a front-end server 106 is running version M of web service 107 by default, then a user who requests web service 107 from this front-end server 106 is provided access to version M. In addition, one embodiment of the invention provides a consistent web service experience to the user. In particular, according to this embodiment, if the user has previously registered or accessed to version M of web service 107, said user is provided access to version M of web service 107 thereafter throughout the upgrade process. For example, the user may have registered to access version M of web service 107 through login server 108, or client computer system 102, through which the user accesses web service 107 provided by front-end servers 106, may have a cookie that identifies version M as the latest version of web service 107 accessed by the user. In such cases, the selected version of web service 107 is version M regardless of the default version of web service 107 running on the currently accessed front-end server 106. If the default version of web service 107 on the accessed front-end server 106 is version N, then the accessed front-end server 106 is directed to provide the user access to the selected version M of web service 107 executed on it instead of the default version N.

Proceeding to 208 of FIG. 2, version N of web service 107 can be incrementally removed from front-end servers 106. In general, if a particular front-end server 106 is configured to run version M of web service 107 by default, and version M is stabilized or running properly on the particular front-end server 106 (e.g., version M on the particular front-end server 106 is beta tested to be without issues), then version N of web service 107 may be removed from the particular front-end server 106. After version N of web service 107 is removed from this particular front-end server 106, users who are directed to this particular front-end server 106 may be provided access to version M of web service 107. This removal process is conducted incrementally until every server of the front-end servers 106 has version M of web service 107 installed on it. Thus, at 210 of FIG. 2, version M of web service 107 is available from every server of front-end servers 106. At this point, the rolling upgrade process is complete.

Figure 3:
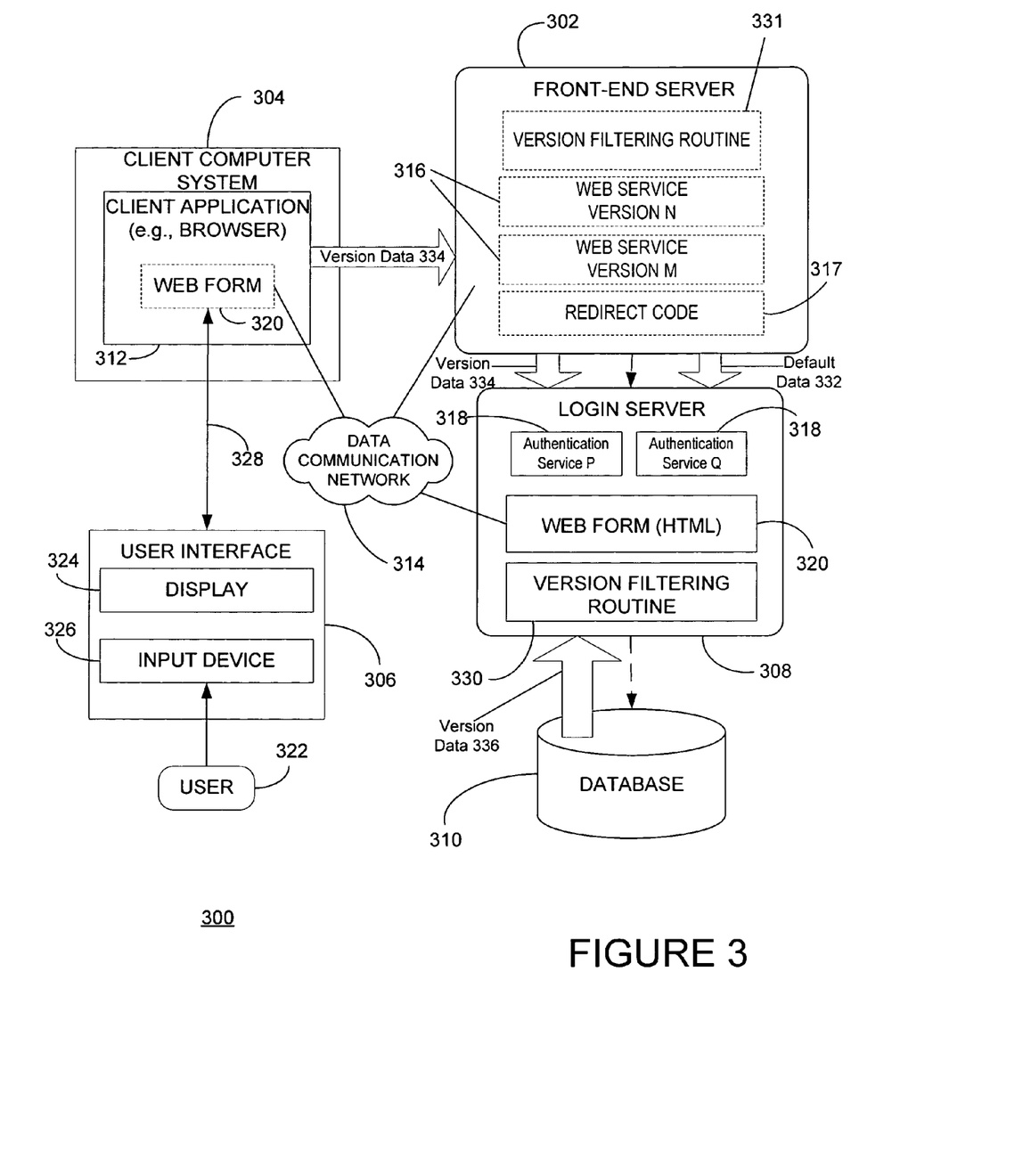
FIG. 3 is a block diagram illustrating exemplary interactions between a front-end server, a client computer system having a user interface, and a login server coupled to a database.

Referring now to FIG. 3, an exemplary environment 300 according to one embodiment of the invention generally shows exemplary interactions between a front-end server 302, a client computer system 304 having a user interface 306, and a login server 308 coupled to a database 310. FIG. 3 shows front-end server 302 receiving a request from client computer system 304 having a client application 312 (e.g., a web browser) via a data communication network 314. The request from client computer system 304 may be a request for a web service 316 (or web service 107) provided by front-end server 302. FIG. 3 further shows that front-end server 302 has two versions of web service 316 executed on it. One is the older version N, and the other is the newer version M. Front-end server 302 of FIG. 3 might be in the process of being upgraded from version N of web service 316 to version M of web service 316. Front-end server 302 may be configured to run version N by default or may be configured to run version M by default, depending on the current stage of the rolling upgrade process. Front-end server 302 further includes a redirect code 317. Redirect code 317 is utilized to redirect a request for web service 316 from front-end server 302 to another server (e.g., to another front-end server, to a back-end server, or to a login server such as login server 308). Using redirect code 317, front-end server 302 redirects the received request for web service 306 to login server 308 via data communication network 314. In one embodiment of the invention, HTTP is used to direct the request for web service 316 from client computer system 304 to front-end server 302, and to redirect the request from front-end server 302 to login server 308.

As shown in FIG. 3, login server 308 includes two versions of an authentication service 318, namely version P and version Q. Which version of authentication service 318 that login server 308 executes to authenticate client computer system 304 depends on a selected version of web service 316 associated with front-end server 302. Generally, if front-end server 302 is running version N of web service 316 by default, then login server 308 executes version P of authentication service 318 to authenticate client computer system 304. If front-end server 302 is running version M of web service 316 by default, then login server 308 executes version Q of authentication service 318 to authenticate client computer system 304. In one embodiment of the invention, if the system administrators decide to upgrade login server 308 prior to upgrading front-end server 302, then the version of authentication service 318 that a user accesses may determine which version of web service 316 that is to be provided to the user. As one particular example, a user authenticated by version P of authentication service 318 may be provided version N of web service 316 at front-end server 302. As another particular example, a user authenticated by version Q of authentication service 318 may be provided version M of web service 316 at front-end server 302. As such, either login server 308 or front-end server 302 may determine which version of web service 316 is to be provided to the user.

FIG. 3 further shows a web form 320 located on login server 308. In one exemplary embodiment of the invention, web form 320 may be a hypertext markup language (HTML) document such as a web page or a web form that is provided to client computer system 304 via data communication network 314. Web form 320 located on login server 308 and provided to client computer system 304 is used to accept authentication data such as a login ID and/or password from a user 322 using client computer system 304.

User interface 306 linked to client application 312 of client computer system 304 allows user 322 to interact with web form 320 provided to client computer system 304 and now located on client application 312. In one exemplary embodiment of the invention, user interface 306 may include a display 324 such as a monitor or any other displaying device for viewing the web form. User interface 306 may also include an input device 326 such as a keyboard, pointing device (e.g., a mouse, trackball, pen, or touch pad), or any other input device for entering authentication data (e.g., a login ID and/or password) into web form 320. In other words, user interface 306 allows user 322 to interact with web form 320 to define an input data stream, as indicated by reference character 328. The input data stream includes the authentication data entered by user 322. The completed web form 320 is then provided to login server 308 as an input data stream via data communication network 314. In response to the provided input data stream comprising the authentication data of user 322, login server 308 executes authentication service 318 to retrieve valid user data of user 322 from database 310. Authentication service 318 of login server 308 further verifies that the authentication data of user 322 included in the input data stream corresponds to the valid user data of user 322 stored in database 310. If the authentication data corresponds to the valid user data, then user 322 is provided access to web service 316. If the authentication data does not correspond to the valid user data, then user 322 is denied access to web service 316.

Also shown in FIG. 3 is a version filtering routine 330 located on login server 308. Version filtering routine 330 is executed by login server 308 to filter a version data (e.g., in a request header) accompanying the request for web service 316 in order to identify a selected version of web service 316 associated with front-end server 302. The version data specifying the selected version might be carried on a query string, post content, or cookie stored in client application 312 of client computer system 304. This version data might also be part of an encrypted blob. For example, the version data specifying the selected version of web service 316 might come from front-end server 302 which redirected the request for web service 316 to login server 308. This version data might be stored in web form 320 or in a cookie of client application 312, which is sent back to login server 308 in subsequent requests for web service 316. In one embodiment of the invention, a version filter routine 331 similar to version filtering routine 330 may also be located on front-end server 302. The version filtering 331 may be utilized separately or in conjunction with version filtering routine 330.

Generally, after version filtering routine 330 of login server 308 and/or version filtering routine 331 of front-end server 302 identify the selected version of web service 316 by filtering the version data, and authentication service 318 of login server 308 verifies that the authentication data included in the input data stream corresponds to the valid user data stored in database 310, the request for web service 316 is redirected back to front-end server 302. This time, accompanying the request is a selected version of web service 316 identified by version filtering routine 330 and/or 331. Since both versions of web service 316 (i.e., version N and version M) are installed on front-end server 302, version filtering routine 330 and/or 331 simply direct front-end server 302 to provide user 322 access to the selected version of web service 316 (either version N or version M) identified by version filtering routine 330 and/or 331. It is to be understood that one or another version may be selected as preferred over the other because it provides a more consistent and desirable user experience.

In one embodiment of the invention, version filtering routine 330 of login server 308 and/or version filtering routine 331 of front-end server 302 identify the selected version of web service 316 associated with front-end server 302 by identifying the default version of web service 316 running on front-end server 302. For example, as shown by FIG. 3, when front-end server 302 redirects the request for web service 316 to login server 308, a default data 332 is sent along with the redirected request to login server 308. Default data 332 identifies the default version of web service 316 running on front-end server 302. The default version may be version N or version M depending on the stage of the rolling upgrade process. Thus, if front-end server 302 is running version N by default, default data 332 specifies version N as the default version. If front-end server 302 is running version M by default, default data 332 specifies version M as the default version. When login server 308 processes the redirected request for web service 316, version filtering routine 330 of login server 308 and/or version filtering routine 331 of front-end server 302 filter the redirected request to retrieve default data 332. Version filtering routine 330 and/or 331 identify the default version of web service 316 running on front-end server 302 by examining default data 332. If default data 332 specifies version N as the default version, then version filtering routine 330 and/or 331 identify version N as the selected version of web service 316, and front-end server 302 is directed to provide version N to user 322. If default data 332 specifies version M as the default version, then version filtering routine 330 and/or 331 identify version M as the selected version of web service 316, and front-end server 302 is directed to provide version M to user 322.

In accordance with another embodiment of the invention, the selected version of web service 316 associated with front-end server 302 and with regard to user 322 is not the default version of web service 316 running on front-end server 302. In one example according to the exemplary embodiment, user 322 might have previously accessed version M of web service 316 using client computer system 304. In this instance, client application 312 (e.g., a web browser) of client computer system 304 might have a cookie stored in a cache of client application 312. The cookie might specify version M of web service 316 as the selected version since version M might be the latest version of web service 316 accessed by user 322. In such a scenario, in order to provide a consistent user experience with web service 316, the embodiment of the invention provides user 322 access to version M of web service 316 regardless of which version of web service 316 that is running on front-end server 302 by default. Thus, when user 322 sends a request for web service 316 to front-end server 302 through client computer system 304, a version data 334 (e.g., a cookie, query string, or post content) identifying the latest version of web service 316 accessed by the user is sent to front-end server 302 along with the request, as shown in FIG. 3.

Also shown in FIG. 3, when front-end server 302 redirects the request for web service 316 to login server 308, version data 334 and default data 332 are sent along with the redirected request to login server 308. Version filtering routine 330 of login server 308 and/or version filtering routine 331 of front-end server 302 examine version data 334 to identify the latest version of web service 316 accessed by user 322 using client computer system 304. If version M is identified as the latest version of web service 316 accessed by user 322 using client computer system 304, then version filtering routine 330 and/or 331 identify version M as the selected version of web service 316 associated with front-end server 302, even if default data 332 specifies version N as the default version running on front-end server 302. Therefore, front-end server 302 is directed to provide user 322 access to version M of web service 316. This embodiment of the invention advantageously allows user 322 to experience or access a consistent version of web service 316 throughout the rolling upgrade process. In other words, if user 322 has previously experienced or accessed version M of web service 316 using client computer system 304, the embodiment of the invention allows user 322 using the same client computer system 304 to be thereafter provided access to version M consistently.

Another example according to one embodiment of the invention in which the selected version of web service 316 associated with front-end server 302 is not the default version running on the front-end server 302 involves user 322 having previously registered to access version M of web service 316. A version of web service 316 may be registered through login server 308, through another login server providing authentication service 318, or through a front-end server (e.g., one of the front-end servers 106). In one exemplary embodiment of the invention, if user 322 is registered to access version M provided by a front-end server (e.g., front-end server 302), a version data 336 identifying version M as the version registered by user 322 is stored in database 310 along with the valid user data of user 322. When login server 308 retrieves the valid user data of user 322 from database 310 for authenticating the authentication data submitted by user 322, login server 308 may also retrieve version data 336 from the database 310, as shown in FIG. 3. Version filtering routine 330 of login server 308 and/or version filtering routine 331 of front-end server 302 examine version data 336 to identify the version of web service 316 registered by user 32. If version M is identified as the version of web service 316 registered by user 322, version filtering routine 330 and/or 331 identify version M as the selected version of web service 316 associated with front-end server 302, even if default data 332 specifies version N as the default version running on front-end server 302. Therefore, front-end server 302 is directed to provide user 322 access to version M of web service 316.

One scenario arises in which after configuring version M to be the default version of web service 316 running on front-end server 302, version M does not stabilize on front-end server 302 (e.g., version M may run into issues or problems). In such a scenario, rolling back the default version from version M to version N might be necessary to fix the issues of version M executed on front-end server 302 while still allowing user 322 to access web service 316. In accordance with one embodiment of the invention, if rollback is necessary on front-end server 302 (i.e., if version M needs to be fixed, removed, or reinstalled), then front-end server 302 should be directed to provide user 322 access to version N of web service 316. Front-end server 302 may provide access to version N because version N may still be executed on it during this stage of the rolling upgrade process. In this case, user 322 should be provided access to version N of web service 316 even if user 322 has previously accessed version M of web service 316 using client computer system 304 (e.g., version data 334 identifies version M as the latest version accessed), or even if user 322 has previously registered to access version M of web service 316 (e.g., version data 336 identifies version M as the registered version). This embodiment of the invention allows system administrators to effectively conduct a complete rollback of the upgrade process. It also might prevent users from encountering a possibly error-prone newer version of a web service during the rolling upgrade process.

Figure 4:
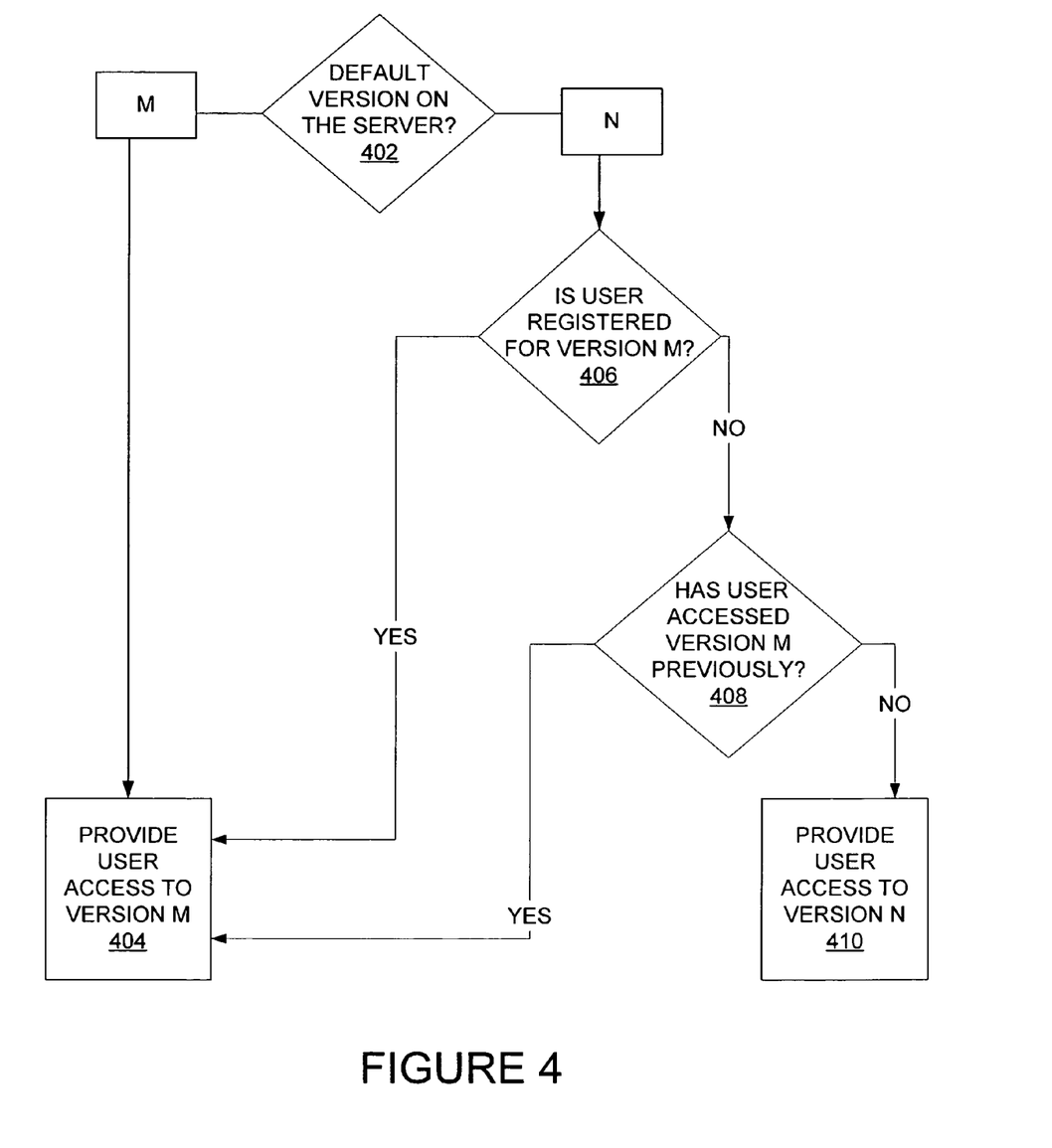
FIG. 4 is an exemplary flow diagram illustrating process flow for identifying a selected version of a web service according to one embodiment of the invention.

FIG. 4 shows generally an exemplary flow diagram illustrating process flow for identifying a selected version of a web service according to one embodiment of the invention. As discussed, during earlier stages of the rolling upgrade process, one or more of the front-end servers are installed with at least two versions of the web service (i.e., before version N is incrementally removed from the front-end servers). A particular front-end server may be configured to run version N by default, or it may be configured to run version M by default. At 402, one exemplary embodiment of the invention identifies the default version of the web service running on the particular front-end server. If the default version of the web service running on the front-end server is version M, then the user is provided access to version M of the web service, as indicated by 404. If the default version of the web service running on the front-end server is version N, then the embodiment proceeds to 406. At 406, the embodiment identifies if the user is registered for version M. If the user is registered for version M, then the user is provided access to version M at 404. If the user is not registered for version M, then the embodiment proceeds to 408. At 408, the embodiment identifies if the user has previously accessed version M. If the user has previously accessed version M, then the user is provided access to version M at 404. If the user has not previously accessed version M, then the user is provided access to version N, as indicated by 410. It is noted that even though FIG. 4 shows the embodiment identifying if the user is registered for version M before identifying if the user has previously accessed version M, it is also contemplated that the embodiment identifies if the user is registered for version M after or contemporaneously with identifying if the user has previously accessed version M.

Figure 5:
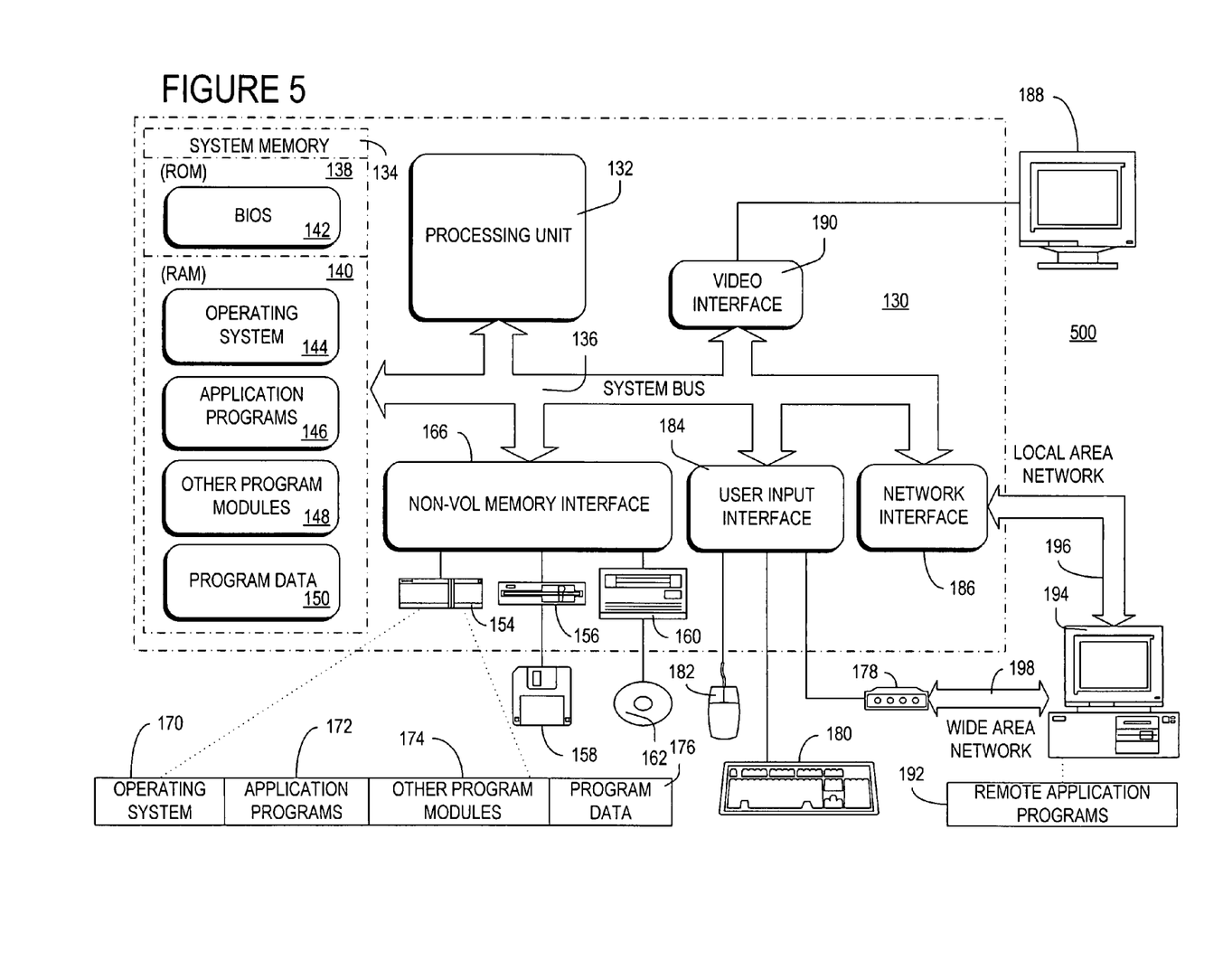
FIG. 5 is a block diagram illustrating exemplary components of a computer for use with the present invention.

FIG. 5 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a data communication network. In a distributed computing environment, program modules may be located in both local and remote computer storage media including memory storage devices. In operation, computer 130 executes computer-executable instructions such as those illustrated in FIGS. 1-4 to manage a web service provided by a plurality of servers coupled to a data communication network, where at least one of the servers executes a first version of the web service. Instructions are adapted to execute a second version of the web service on a first server coupled to the data communication network. A selected version of the web service is identified based on a request from a user to access the web service via the data communication network. Instructions are adapted to provide the user access to the identified selected version of the web service via a client also coupled to the data communication network. One or more servers providing the web service may specify a default version of the web service as the selected version if the request from the user does not specify a version of the web service for access.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of managing a web service provided by a plurality of servers coupled to a data communication network, at least one of said servers executing a first version of the web service, said method comprising:

executing a second version of the web service on a first server coupled to the data communication network, wherein the first server also includes the first version of the web service executed thereon;

identifying a selected version of the web service based on a request from a user to access the web service via the data communication network;

generating a first data stream associated with the user in response to the request, said generated first data stream includes at least one of the following: default data and version data, said default data specifying a default version of the web service associated with the first server, said version data identifying a latest version of the web service accessed by the user, wherein the identifying the selected version of the web service comprises processing the first data stream, said processing the first data stream includes identifying the second version of the web service as the selected version if the version data identifies the second version as the latest version of the web service accessed by the user and the default data specifies the first version as the default version of the web service; and providing the user access to the identified selected version of the web service associated with the first server via a client also coupled to the data communication network.

2. The method of claim 1 further comprising updating the first version of the web service executed on a second server coupled to the data communication network with the second version of the web service while the user is provided access to the identified selected version of the web service by the first server.

3. The method of claim 1, wherein the first version corresponds to an older version of the web service and the second version corresponds to a newer version of the web service.

4. The method of claim 1, wherein the processing the first data stream includes executing a filtering routine in response to the generated first data stream to identify the default version of the web service as the selected version of the web service.

5. The method of claim 1, wherein the default data specifies the second version of the web service as the default version after executing the second version on the first server.

6. The method of claim 5 further including specifying the first version of the web service as the default version if the second version of the web service is not stabilized on the first server, and wherein identifying the selected version includes identifying the first version of the web service as the selected version irrespective of a latest version of the web service accessed by the user or a version of the web service registered by the user.

7. The method of claim 5 further including removing the first version of the web service from the first server if the second version of the web service is stabilized on the first server.

8. The method of claim 1, wherein processing the first data stream includes:
receiving the first data stream at an authentication service executed by a second server, said second server also being coupled to the data communication network; and
providing a web form to the user via the data communication network in response to the first data stream being received by the authentication service, said web form providing an interface for receiving a second data stream from the user, said second data stream including authentication data corresponding to the user.

9. The method of claim 8 further comprising:
authenticating the user, by the authentication service, based on the second data stream; and
providing the authenticated user access to the selected version of the web service.

10. The method of claim 9 further including storing version data in a database, said version data identifying a version of the web service registered by the user, wherein authenticating the user includes retrieving version data identifying a version of the web service registered by the user, and wherein identifying the selected version further includes identifying the second version of the web service as the selected version if the retrieved version data identifies the second version as the version of the web service registered by the user and the default data specifies the first version as the default version of the web service.

11. The method of claim 8, wherein the authentication data includes at least a valid user login identifier and a valid user password.

12. One or more computer readable storage media having computer-executable instructions stored thereon for performing the method of claim 1.

13. A system to manage a web service provided by a plurality of servers coupled to a data communication network, at least one of said servers executing a first version of the web service, comprising:
a first server coupled to the data communication network, said first server adapted to have a second version of the web service executed thereon, wherein the first server also includes the first version of the web service executed thereon;
a computer-readable storage medium associated with the first server having computer-executable instructions stored thereon to identify a selected one of the versions of the web service based on a request from a user to access the web service via the data communication network;
a computer-readable storage medium associated with the first server having computer-executable instructions stored thereon to generate a first data stream associated with the user in response to the request, said generated first data stream includes at least one of the following: default data and version data, said default data specifying a default version of the web service associated with the first server, said version data identifying a latest version of the web service accessed by the user, wherein the identifying comprises processing the first data stream, said processing the first data stream includes identifying the second version of the web service as the selected version if the version data identifies the second version as the latest version of the web service accessed by the user and the default data specifies the first version as the default version of the web service; and
a computer-readable storage medium associated with the first server having computer-executable instructions stored thereon to provide the user access to the identified selected version of the web service associated with the first server via a client also coupled to the data communication network.

14. The system of claim 13 further comprising a second server also coupled to the data communication network, said second server adapted to have at least the first version of the web service executed thereon, further comprising computer-executable instructions to update the first version of the web service executed on the second server with the second version of the web service while the user is provided access to the identified selected version of the web service by the first server.

15. The system of claim 13, wherein the first version corresponds to an older version of the web service and the second version corresponds to a newer version of the web service.

16. The system of claim 13, further comprising a filtering routine executed in response to the generated first data stream to identify the default version of the web service as the selected version of the web service.

17. The system of claim 13, wherein the default data is adapted to specify the second version of the web service as the default version after executing the second version on the first server.

18. The system of claim 17 further comprising computer-executable instructions to specify the first version of the web service as the default version if the second version of the web service is not stabilized on the first server, and wherein the first version of the web service is identified as the selected version irrespective of a latest version of the web service accessed by the user or a version of the web service registered by the user.

19. The system of claim 17 further comprising computer-executable instructions to remove the first version of the web service from the first server if the second version of the web service is stabilized on the first server.

20. The system of claim 13 further comprising a second server also coupled to the data communication network, said second server adapted to execute an authentication service, said authentication service responsive to the first data stream to provide a web form to the user via the data communication network, said web form adapted to provide an interface to receive a second data stream from the user, said second data stream adapted to include authentication data corresponding to the user.

21. The system of claim 20 further comprising computer-executable instructions to:
authenticate the user, by the authentication service, based on the second data stream; and
provide the authenticated user access to the selected version of the web service.

22. The system of claim 21 further comprising a database associated with the second server, said database adapted to store version data, said version data adapted to identify a version of the web service registered by the user, and wherein the second version of the web service is identified as the selected version if the version data retrieved from the database identifies the second version as the version of the web service registered by the user and the default data specifies the first version as the default version of the web service.

23. The system of claim 20, wherein the authentication data is adapted to include at least a valid user login identifier and a valid user password.

24. A computer-readable storage medium having computer-executable instructions stored thereon for performing a method to manage a web service provided by a plurality of servers coupled to a data communication network, at least one of said servers executing a first version of the web service, said method comprising:
 executing a second version of the web service on a first server coupled to the data communication network, wherein the first server also includes the first version of the web service executed thereon;
 processing a request from a user to access the web service via the data communication network to identify a selected version of the web service;
 generating a first data stream associated with the user in response to the request, said generated first data stream includes at least one of the following: default data and version data, said default data specifying a default version of the web service associated with the first server, said version data identifying a latest version of the web service accessed by the user,
 wherein the processing comprises processing the first data stream, said processing the first data stream includes identifying the second version of the web service as the selected version if the version data identifies the second version as the latest version of the web service accessed by the user and the default data specifies the first version as the default version of the web service; and
 providing the user access to the identified selected version of the web service associated with the first server via a client also coupled to the data communication network.

25. The computer-readable storage medium of claim 24, wherein the method further comprises updating the first version of the web service executed on a second server coupled to the data communication network with the second version of the web service while the user is provided access to the identified selected version of the web service by the first server.

26. The computer-readable storage medium of claim 24, wherein the first version corresponds to an older version of the web service and the second version corresponds to a newer version of the web service.

27. The computer-readable storage medium of claim 24, wherein said processing the request further comprises filtering the generated first data stream to identify the default version of the web service as the selected version of the web service.

28. The computer-readable storage medium of claim 24, wherein the default data specifies the second version of the web service as the default version after executing the second version on the first server.

29. The computer-readable storage medium of claim 28, wherein the method further comprises specifying the first version of the web service as the default version if the second version of the web service is not stabilized on the first server, and wherein said processing the request further comprises identifying the first version of the web service as the selected version irrespective of a latest version of the web service accessed by the user or a version of the web service registered by the user.

30. The computer-readable storage medium of claim 27, wherein the method further comprises removing the first version of the web service from the first server if the second version of the web service is stabilized on the first server.

31. The computer-readable storage medium of claim 24 further comprising processing the first data stream for:
 receiving the first data stream at an authentication service executed by a second server, said second server also being coupled to the data communication network; and
 providing a web form to the user via the data communication network in response to the first data stream being received by the authentication service, said web form providing an interface for receiving a second data stream from the user, said second data stream including authentication data corresponding to the user.

32. The computer-readable storage medium of claim 31 wherein the method further comprises:
 authenticating the user, by the authentication service, based on the second data stream; and
 providing the authenticated user access to the selected version of the web service.

33. The computer-readable storage medium of claim 32, wherein the method further comprises storing version data in a database, said version data identifying a version of the web service registered by the user, wherein authenticating the user includes retrieving version data identifying a version of the web service registered by the user, and wherein processing the request further includes identifying the second version of the web service as the selected version if the retrieved version data identifies the second version as the version of the web service registered by the user and the default data specifies the first version as the default version of the web service.

34. The computer-readable storage medium of claim 31, wherein the authentication data includes at least a valid user login identifier and a valid user password.

35. A computer-readable storage medium having computer-executable components stored thereon for managing a web service provided by a plurality of servers coupled to a data communication network, at least one of said servers executing a first version of the web service, said computer-readable storage medium comprising:
 an update component for executing a second version of the web service on a first server coupled to the data communication network, wherein the first server also includes the first version of the web service executed thereon;
 a processing component for processing a request from a user to access the web service via the data communication network to identify a selected version of the web service;
 wherein the processing component is configured to generate a first data stream associated with the user in response to the request, said generated first data stream includes at least one of the following: default data and version data, said default data specifying a default version of the web service associated with the first server, said version data identifying a latest version of the web service accessed by the user,
 wherein the processing component is further configured to process the first data stream, said processing the first data stream includes identifying the second version of the web service as the selected version if the version data identifies the second version as the latest version of the web service accessed by the user and the default data specifies the first version as the default version of the web service; and a providing component for providing the user access to the identified selected version of the web service associated with the first server via a client also coupled to the data communication network.

36. The computer-readable storage medium of claim 35, wherein the processing component is further configured to filter the generated first data stream to identify the default version of the web service as the selected version of the web service.

* * * * *